(12) United States Patent
Yun et al.

(10) Patent No.: US 11,956,264 B2
(45) Date of Patent: Apr. 9, 2024

(54) METHOD AND SYSTEM FOR VERIFYING VALIDITY OF DETECTION RESULT

(71) Applicant: LINE Corporation, Tokyo (JP)

(72) Inventors: Juho Yun, Seongnam-si (KR); Seongho Ka, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 250 days.

(21) Appl. No.: 16/403,994

(22) Filed: May 6, 2019

(65) Prior Publication Data
US 2019/0260797 A1    Aug. 22, 2019

Related U.S. Application Data

(63) Continuation of application No. PCT/KR2016/013526, filed on Nov. 23, 2016.

(51) Int. Cl.
*H04L 29/06* (2006.01)
*H04L 9/40* (2022.01)
*H04L 69/00* (2022.01)

(52) U.S. Cl.
CPC ............ *H04L 63/1433* (2013.01); *H04L 9/40* (2022.05); *H04L 63/1425* (2013.01); *H04L 63/20* (2013.01); *H04L 69/00* (2013.01)

(58) Field of Classification Search
CPC . H04L 63/1433; H04L 63/1425; H04L 63/20; H04L 63/1416

(Continued)

(56) References Cited

U.S. PATENT DOCUMENTS

| 6,473,772 | B1 * | 10/2002 | Barrett, Jr. .............. G06F 30/33 |
| 6,856,950 | B1 * | 2/2005 | Abts ....................... G06F 30/33 |
| | | | 703/13 |

(Continued)

FOREIGN PATENT DOCUMENTS

| KR | 2001-0079361 A | 8/2001 |
| KR | 2004-0042397 A | 5/2004 |

(Continued)

OTHER PUBLICATIONS

International Search Report PCT/ISA/210 for International Application No. PCT/KR2016/013526 dated Jul. 24, 2017.

*Primary Examiner* — Saleh Najjar
*Assistant Examiner* — Peiliang Pan
(74) *Attorney, Agent, or Firm* — Harness, Dickey & Pierce, P.L.C.

(57) ABSTRACT

A validity verification method may include receiving an event to be analyzed from a security information & event management (SIEM) server, the event to be analyzed selected by the SIEM server from a plurality of events detected by different security devices based on a desired correlation rule; registering the event to be analyzed; collecting raw data associated with the registered event from a security device corresponding to the registered event among the different security devices; acquiring location information of an intended network location associated with an attack based on the collected raw data; determining a validity status of the registered event based on the acquired location information; generating an exceptional processing message of the registered event; and transmitting the generated exceptional processing message to the SIEM server based on results of the determining the validity status of the registered event.

20 Claims, 12 Drawing Sheets

(58) Field of Classification Search
USPC .......................................................... 726/1
See application file for complete search history.

(56) References Cited

U.S. PATENT DOCUMENTS

| | | | | |
|---|---|---|---|---|
| 7,469,287 | B1* | 12/2008 | Castillo | H04L 41/0663 709/224 |
| 7,783,544 | B2* | 8/2010 | Horowitz | G06Q 40/00 705/35 |
| 7,974,888 | B2* | 7/2011 | Kane, Jr. | G06Q 30/0641 705/26.7 |
| 8,578,493 | B1* | 11/2013 | Cowan | G06F 21/554 709/224 |
| 9,686,296 | B1* | 6/2017 | Murchison | H04L 63/1425 |
| 9,892,178 | B2* | 2/2018 | Schuster | G06F 16/254 |
| 10,380,100 | B2* | 8/2019 | Dubeyko | G06F 16/122 |
| 10,467,327 | B1* | 11/2019 | Arazi | G06Q 50/01 |
| 2001/0056362 | A1* | 12/2001 | Hanagan | H04M 15/51 705/7.11 |
| 2004/0064207 | A1* | 4/2004 | Zacks | G11B 27/034 700/91 |
| 2006/0179140 | A1* | 8/2006 | John | H04L 63/102 709/225 |
| 2007/0262857 | A1* | 11/2007 | Jackson | G06T 7/70 340/506 |
| 2008/0091630 | A1* | 4/2008 | Bonissone | G06K 9/6284 706/45 |
| 2008/0209078 | A1* | 8/2008 | Bates | G06Q 10/00 710/10 |
| 2009/0003284 | A1* | 1/2009 | Chin | H04W 16/22 370/332 |
| 2010/0306590 | A1* | 12/2010 | Anand | G06F 11/3692 714/32 |
| 2012/0174075 | A1* | 7/2012 | Carteri | G06F 11/3688 717/127 |
| 2012/0226652 | A1* | 9/2012 | Gupta | G06N 7/005 706/52 |
| 2013/0002794 | A1* | 1/2013 | Hines | H04L 65/4076 348/14.01 |
| 2013/0160122 | A1 | 6/2013 | Choi et al. | |
| 2013/0247206 | A1* | 9/2013 | Hugard, IV | G06F 21/57 726/25 |
| 2014/0032641 | A1* | 1/2014 | Du | H04L 43/065 709/203 |
| 2014/0075018 | A1* | 3/2014 | Maycotte | H04L 67/306 709/224 |
| 2014/0373099 | A1* | 12/2014 | Durbha | H04L 63/10 726/4 |
| 2015/0143348 | A1* | 5/2015 | You | G06F 8/37 717/146 |
| 2015/0213358 | A1* | 7/2015 | Shelton | H04L 41/0604 706/47 |
| 2016/0112213 | A1* | 4/2016 | Lee | H04L 41/00 455/507 |
| 2016/0117778 | A1* | 4/2016 | Costello | G06Q 40/08 705/4 |
| 2016/0125725 | A1* | 5/2016 | Sager | G08B 25/005 340/502 |
| 2016/0182338 | A1* | 6/2016 | Ragupathi | H04L 41/0816 709/224 |
| 2016/0205118 | A1* | 7/2016 | Kim | H04L 63/1425 726/23 |
| 2016/0226895 | A1* | 8/2016 | Huang | G06F 21/552 |
| 2016/0314224 | A1* | 10/2016 | Wei | G06F 30/20 |
| 2016/0343224 | A1* | 11/2016 | Markwell | G01S 5/0027 |
| 2017/0034108 | A1* | 2/2017 | Fechete | H04L 67/02 |
| 2017/0092109 | A1* | 3/2017 | Trundle | G16H 40/20 |
| 2017/0178013 | A1* | 6/2017 | Beloglazov | G01C 21/3697 |
| 2017/0238882 | A1* | 8/2017 | Ma | A61B 6/545 |
| 2018/0032829 | A1* | 2/2018 | Kim | G06K 9/00771 |
| 2018/0089188 | A1* | 3/2018 | Kharisma | G06F 16/2477 |

FOREIGN PATENT DOCUMENTS

| | | |
|---|---|---|
| KR | 2009-0076612 A | 7/2009 |
| KR | 2011-0006175 A | 1/2011 |
| KR | 2011-0022141 A | 3/2011 |

* cited by examiner

FIG. 2

| Attack Type | Signature Group | Severity | Time detected |
|---|---|---|---|
| UDS_316_Eval_One... | User Signature | H High | 2016/09/19 11:05:28 |
| UDS_654_SQL_inje... | User Signature | M Medium | 2016/09/19 11:05:28 |
| UDS_316_Eval_One... | User Signature | H High | 2016/09/19 11:05:27 |
| UDS_316_Eval_One... | User Signature | H High | 2016/09/19 11:05:18 |
| UDS_654_SQL_inje... | User Signature | M Medium | 2016/09/19 11:05:18 |
| UDS_316_Eval_One... | User Signature | H High | 2016/09/19 11:05:17 |

| Source IP | Attacker port | Destination IP | Destination port |
|---|---|---|---|
| 113.57.187.84 | TCP/15970 | 12.6.190.6 | TCP/80 |
| 113.57.187.84 | TCP/7512 | 12.6.190.6 | TCP/80 |
| 113.57.187.84 | TCP/15944 | 12.6.190.6 | TCP/80 |
| 113.57.187.84 | TCP/15979 | 12.6.190.6 | TCP/80 |
| 113.57.187.84 | TCP/7512 | 12.6.190.6 | TCP/80 |
| 113.57.187.84 | TCP/15944 | 12.6.190.6 | TCP/80 |

FIG. 3

| Current event | ☒ |
|---|---|

Detailed Information | Log description | Packet analysis

☐ UDS_316_Eval_One_Line_PHP_WebShell_090803

General info
| | | | |
|---|---|---|---|
| Time occured: | 2016/09/19 11:05:17 | Time detected | 2016/09/19 11:05:17 |
| Sensor: | LD_Sensor02 | Virtual sensor: | LIVEDOOR |
| Severity: | High | Number of | 1count |

Source information
| | | |
|---|---|---|
| IP address: | 113.57.187.84 | Analysis... |
| Port: | 15944 | |
| MAC address: | 28.C0.DA.FC.57.F0 | Network: |

Destination information
| | | |
|---|---|---|
| IP address: | 125.6.190.6 | Analysis... |
| Port: | 80 | |
| MAC | 02.01.D7.8A.18.15 | Network: |

Packet information
| | | | |
|---|---|---|---|
| Protocol: | TCP | TTL: | 41 |
| Packet | 329.00 | Number of packet: | 1count |

Close

FIG. 4

| Current event | ☒ |

Detailed Information | Log description | Packet analysis

Packet
├ MAC Header
├ 802.1Q Virtual LAN
├ IP v4 Header
├ TCP Header
├ Data
└ Pattern Detecked

```
00a0    75 6e 5d 29 3b 3f 3e 20 48 54 54 50 2f 31 2e 31
00b0    0d 0a 41 63 63 65 70 74 3a 20 2a 2f 2a 0d 0a 41
00c0    63 63 65 70 74 2d 4e 61 6e 67 75 61 67 65 3a 20
00d0    7a 68 2d 63 6e 0d 0a 55 73 65 72 2d 41 67 65 6e
00e0    74 3a 20 4d 6f 7a 69 6c 6c 61 2f 35 2e 30 20 28
00f0    63 6f 6d 70 61 74 69 62 6c 65 3b 20 4d 53 49 45
0100    20 39 2e 30 3b 20 57 69 6e 64 6f 77 73 20 4e 54
0110    20 36 2e 31 3b 20 20 4f 57 36 34 3b 20 54 72 69
0120    64 65 6e 74 2f 35 2e 30 29 0d 0a 48 6f 73 74 3a
0130    20 62 6c 6f 67 2e 6c 69 76 65 64 6f 6f 72 2e 6a
0140    70 0d 0a 0d 0a 00 00 00 00
```

......(...W....s
..E..3..@.)...q9
.T}...>H..E..W
D.P...wT..GET/l
ogin.php?makehtm
l=1&chdb.htmlnam
e]=wooyun.php&ch
db[path]=cach&cl
ontent=<?php%20@
eva($_POST[woo
yun]);?>HTTP/1.1
..Accept: */*..A
ccept-Language:
zh.ch..User.Agen
t: Mozilla/5.0 (
compatible; MSIE
9.0;Windows NT
6.1;WoW64;Tri ASCII Character | Ascii character only ▽ | Select Copy | ASCII Copy All Close

FIG. 5

| Events | | | | |
|---|---|---|---|---|
| | endTime | name | sourceAddress | ... |
| | 2016/09/19 11:05:17 | L0078_CS_User_Inb... | 113.57.187.84 | ... |
| | RAW CEF : 0\| ArcSight\| ArcSight\|6.5.1.2083.2\| rule : 102\|L0078_CS_User_In BounD_WebShel_Alert\|High\|eventID=26993438503 end=1474250717000 mrt=1474250738196 cnt=1 dpt=980 type=2 generAtor=3300076020 priority =7 sRc=113.57.187.84 start=147250717000 sessionID=0 modelConfience =0 severity=0 relevance=10 locality=Local asetCriticality=0 cat=/Rule/Fire | | | |
| | ⋮ | | | |

FIG. 6

| | No. | Type | IDC name | Ticket name | attacked IP | ... |
|---|---|---|---|---|---|---|
| ☐ | 2 | Intrusion detection (ESM) | Livedoor | L0078_CS_User_Inbound _WebShell_Alert | 114.198.146.186 | ... |
| ☐ | 1 | Intrusion detection (ESM) | Livedoor | L0078_CS_User_Inbound _WebShell_Alert | 27.153.205.251 | ... |

Correct detection (610) | Incorrect detection (620)

FIG. 7

| | | 740 |
|---|---|---|
| UDS_316_Eval_One_Line_PHP_WebShell_090803 | 125.6.190.6 | 80 |

| | |
|---|---|
| URL | blog.livedoor.jp/login.php?makehtml=1&chdb[htm|name]=wooyun.php&chdb[path]=cache&content= |
| RAW Data | (WsE3@&q9T}>HPEWDPwTGET /login.php?makehtml=1&chdb[htm|name]=wooyun.php&chdb[path]=cache&content=<?php%20@eval($_POST[wooyun]);?>HTTP/<br>Accept: */*<br>Accept-Language: zh-cn<br>User-Agent: Mozilla/5.0 (compatible; MSIE 9.0; Windows NT 6.1; WOW64; Trident/5.0)<br>Host: blog.livedoor.jp |
| Response Code : HTTP_Error:404 Response length :3731 | <!DOCTYPE html><br><htm|lang="ja"><br><head><br><meta charset="UTF-8"><br><title>404 Not Found</title><br><meta name="viewport" content="width=device-width, minimun-scale=1, maximum-scale=1, user-scalable=no"><br><link rel="stylesheet" href="http://fonts.googleapis.com/css?family=Roboto:100"><br>⋮ |

720 — URL
710 — RAW Data
730 — Response

METHOD AND SYSTEM FOR VERIFYING VALIDITY OF DETECTION RESULT

CROSS-REFERENCE TO RELATED APPLICATION(S)

This U.S. non-provisional application is a continuation application of, and claims the benefit of priority under 35 U.S.C. § 365(c) to, Patent Cooperation Treaty (PCT) Application No. PCT/KR2016/013526 filed on Nov. 23, 2016, in the World Intellectual Property Organization (WIPO), which designated the U.S., the entire contents of which are incorporated herein by reference.

BACKGROUND

Field

One or more example embodiments relate to a method, system, apparatus, and/or non-transitory computer readable medium for verifying a validity of an intrusion detection result.

Description of Related Art

An intrusion detection system/intrusion prevention system (IDS/IPS) performs functionality similar to a vaccine in a network and may detect/prevent an attack through the network. Such an IDS/IPS has a function of detecting an unauthorized behavior and an abnormal behavior in a system to be protected, classifying a detected illegal behavior, and detecting an intrusion in real time. Also, the IDS/IPS implements the security of a system by detecting and recording behavior occurring in the network, by immediately recognizing an occurrence of an abnormal situation, and by blocking a packet (e.g., IP packet, UDP packet, etc.) associated with an illegal action. The IDS/IPS includes, for example, a plurality of components. A sensor generates a security event, a console monitors a generated event and controls or alerts the sensor, and a central engine stores the event detected by the sensor in a database and generates an alert from the security event using a system rule. For example, an intrusion detection system and method through a cooperative multi-server and an intrusion detection control system and method are disclosed in Korean Patent Laid-Open Publication No. 10-2009-0076612.

In the meantime, the validity of detection results that are detected through various different security devices including the IDS and stored in a database needs to be directly verified by a person, for example, control personnel that are deployed for a system to be protected. For example, a person in charge of a control center performs the validity verification of verifying response content to the same type of detection results. However, many detection results include ineffective detection results. For example, detection results are generated and recorded for an attack against a site that has actually no influence, such as, for example, a case of returning a 404 error message since an actual attack is made on a specific page, however, the corresponding server fails to find the requested page. In this case, the control personnel need to directly handle an unnecessary verification process on detection results that do not have influence and correspond to a large portion of the entire detection results. That is, it is very inefficient for a person to directly verify the validity for all of the detection results.

SUMMARY

One or more example embodiments provide a validity verification method and system that may decrease and/or prevent resources from being unnecessarily used and may enhance the efficiency of countermeasure for an attack through a network by automating the validity verification for detection results having a relatively low validity verification necessity and/or score based on the influence of events detected in association with a security operation.

According to an aspect of at least one example embodiment, there is provided a validity verification method comprising receiving, using at least one processor, an event to be analyzed from a security information & event management (SIEM) server, the event to be analyzed selected by the SIEM server from a plurality of events detected by different security devices based on a desired correlation rule; registering, using the at least one processor, the event to be analyzed; collecting, using the at least one processor, raw data associated with the registered event from a security device corresponding to the registered event among the different security devices; acquiring, using the at least one processor, location information of an intended network location associated with an attack based on the collected raw data; determining, using the at least one processor, a validity status of the registered event based on the acquired location information; generating, using the at least one processor, an exceptional processing message of the registered event; and transmitting, using the at least one processor, the generated exceptional processing message to the SIEM server based on results of the determining the validity status of the registered event.

According to another aspect of at least one example embodiment, there is provided a validity verification server, comprising at least one processor configured to execute computer-readable instructions. The at least one processor is configured to receive an event to be analyzed from a security information & event management (SIEM) server, the event to be analyzed selected by the SIEM server from a plurality of events detected by different security devices based on a desired correlation rule; register the event to be analyzed; collect raw data associated with the registered event from a security device corresponding to the registered event among the different security devices; acquire location information of an intended network location associated with an attack based on the collected raw data; determine a validity status of the registered event based on the acquired location information; generate an exceptional processing message of the registered event; and transmit the generated exceptional processing message to the SIEM server based on results of the determining the validity status of the registered event.

According to some example embodiments, it is possible to decrease and/or prevent resources from being unnecessarily used and to enhance the efficiency of countermeasure for an attack through a network by automating the validity verification for detection results having a relatively low validity verification necessity and/or score based on the influence of events detected in association with a security operation.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein:

FIG. 2 illustrates an example of a list of events detected in an intrusion detection system (IDS) management console according to at least one example embodiment;

FIG. 3 illustrates an example of detailed information on an event detected in an IDS management console according to at least one example embodiment;

FIG. 4 illustrates an example of actual network packet information on an event detected in an IDS management console according to at least one example embodiment;

FIG. 5 illustrates an example of an alert occurring in a security information & event management (SIEM) server according to at least one example embodiment;

FIG. 6 illustrates an example of a waiting list of a registered event according to at least one example embodiment;

FIG. 7 illustrates an example of verifying influence of a detected event according to at least one example embodiment;

Figure 1:
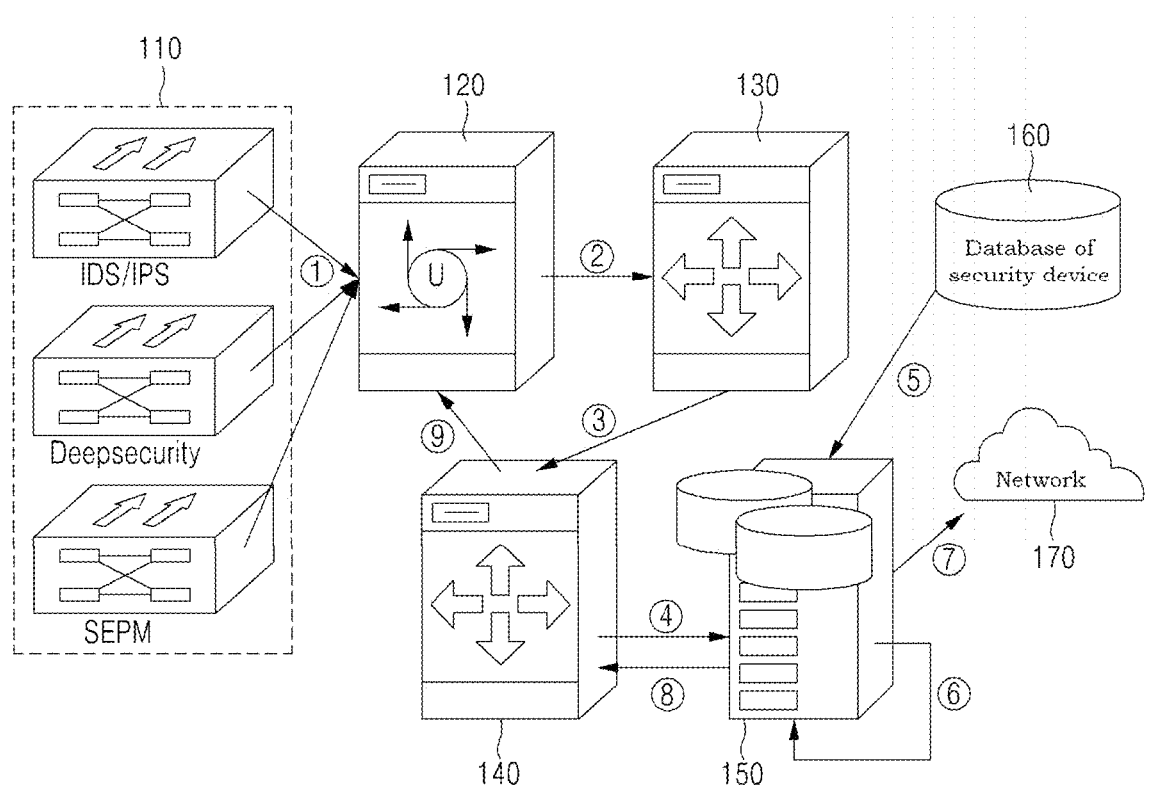
FIG. 1 illustrates an example of a structure of a validity verification system according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or apparatuses discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or apparatuses according to one or more example embodiments may be implemented using hardware and/or a combination of hardware and software. For example, hardware devices may be implemented using processing circuitry such as, but not limited to, a processor, a Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes specially programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or apparatuses according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, etc.), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 illustrates an example of a structure of a validity verification system according to at least one example embodiment.

Referring to FIG. 1, a box 110 indicated with broken lines represents security devices, such as, for example, an intrusion detection system/intrusion prevention system (IDS/IPS), a Deepsecurity device (e.g., a cloud security solution), and/or a Symantec endpoint protection manager (SEPM), etc., but are not limited thereto. The security devices are already known. Accordingly, in addition to the security devices illustrated in FIG. 1, at least one of various security devices that are also well known, for example, a host-based intrusion detection system (HIDS), etc., may be used for the example embodiments. An operation of the security devices to detect an attack through a network 170 can be easily understood by those skilled in the art.

Events detected by the security devices may be transmitted to a security information and event management (SIEM) server 120. A process ① of FIG. 1 represents an example of a process of transmitting events detected at the security devices to the SIEM server 120.

Also, the SIEM server 120 may analyze a correlation between different events and may determine an event based on a desired and/or preset correlation rule. For example, if a first event and a second event occur at a desired and/or preset time interval, for example, at an interval of 1 minute in two or more security devices, etc., and are transmitted to the SIEM server 120, the SIEM server 120 may determine the first event and the second event as events that meet the correlation rule. The correlation rule may be easily understood by those skilled in the art through technology for security information and event management. In this case, the SIEM server 120 may transmit the determined events to a security control management server 130 to be registered as tasks. A process ① of FIG. 1 represents an example of a process of transmitting such an event from the SIEM server 120 to the security control management server 130 and registering the event. For example, the SIEM server 120 may generate a SIEM ticket about the determined events and may transmit the generated SIEM ticket to the security control management server 130. The security control management server 130 may register an event, for example, an event required (and/or desired) to be analyzed, for a specific attack.

The security control management server 130 may provide control personnel (e.g., IT professionals, system administrators, etc.) with information on the events for an attack, registered as a task, and may provide a function that allows the control personnel to process the registered events. For example, the security control management server 130 may provide the control personnel with a user interface that allows the control personnel to verify an attack validity of each of the individual events, and/or to designate the validity thereof based on detailed information on the individual events. The security control management server 130 may be easily understood by those skilled in the art, through technology, for example, a threat management system (TMS).

As described above, it may be very inefficient for a person to directly verify the validity (e.g., verify the validity status) of all of the registered events. In other words, it may be difficult, time consuming, and/or a waste of resources to have a person manually verify each registered event to determine whether each event is a genuine and/or credible attack, or a false positive of an attack. Accordingly, the validity verification system according to at least one of the example embodiment may include an event analysis server 140 and/or a log verification server 150, etc. Although the validity verification system includes the security control management server 130, the event analysis server 140, and/or the log verification server 150, etc., as individual devices, the example embodiments are not limited thereto, and, for example, the event analysis server 140 and the log verification server 150 may be provided as a single system through integration with the security control management server 130, etc. For example, a single server device may provide all of the functions to be provided through the security control management server 130, the event analysis server 140, and the log verification server 150, etc.

The event analysis server 140 may collect an event registered to the security control management server 130. For example, the event analysis server 140 may collect events registered to the security control management server 130 at desired and/or preset time intervals, for example, every 1 minute, but is not limited thereto. A process ③ of FIG. 1 may represent a process of collecting registered events using the event analysis server 140.

Also, the event analysis server 140 may transmit the collected events to the log verification server 150. For example, a process ④ may represent an example of a process in which the event analysis server 140 inserts the collected events into the log verification server 150.

The log verification server 150 may collect raw data corresponding to a collected event from a database 160 of a security device in which the corresponding event is generated. For example, the log verification server 150 may refer to the database 160 of the security device in which a corresponding event is generated based on information, for example, a name of the received event, an IP address/port number of a source, and/or an IP address/port number of a destination, etc., and may acquire raw data corresponding to the event as a reference result. A process ⑤ may represent an example of a process of collecting raw data.

The log verification server 150 may parse the collected raw data. A process ⑥ of FIG. 1 may represent an example of a process of parsing the collected raw data. For example, the raw data may be parsed to extract a uniform resource identifier (URI) of a page intended by an attack corresponding to the event.

Also, the log verification server 150 may verify a response result by executing the same attack as an attack corresponding to the event based on the parsed information. For example, the log verification server 150 may execute the same attack (e.g., simulate an attack) as an actual attack through the network 170 on a page verified with the extracted URI and may verify a response result on the verified page. A process ⑦ may represent an example of a process of verifying the response result.

The log verification server 150 may transmit the verified response result to the event analysis server 140. A process ⑧ may represent an example of a process of transmitting the response result.

The event analysis server 140 may analyze the transmitted response result and may determine a risk level of the event. For example, in response to receiving an HTTP 404 message indicating that the corresponding page is not found due to the attack executed through the URI during the process ⑦ (e.g., the attack was directed towards a non-existent webpage and therefore generated an HTTP 404—page not found message), the corresponding attack may be determined as an uninfluential attack (e.g., an inconsequential attack, etc.) and the corresponding event may be determined as a low risk event. Here, the event analysis server 140 may transmit a SIEM event to the SIEM server 120 with respect to a high risk event, for example, an event of which a risk level is greater than or equal to a desired and/or preset threshold. Also, the event analysis server 140 may transmit an exceptional processing message to the SIEM server 120 with respect to a low risk event, for example, an event of which a risk level is less than the desired and/or preset threshold. A process ⑨ may represent an example of a process of transmitting a SIEM event and/or exceptional processing message.

Here, in response to the exceptional processing message, the SIEM server 120 may add an event corresponding to the exceptional processing message to a SIEM filter. In this case, an event according to an attack occurring with respect to the same URI may be additionally filtered in the SIEM server 120. Accordingly, the exceptionally processed (e.g., automatically processed, etc.) events may not be transmitted to the security control management server 130. Also, since a plurality of packets (e.g., TCP/IP packets, UDP packets, etc.) for the same attack are present, a number of events for which validity (e.g., the validity status) is to be verified by the control personnel in the security control management server 130 suddenly decreases according to an increase in the number of events to be exceptionally processed. That is, since the validity verification system may automatically verify the validity of an influential event, it is possible to decrease and/or prevent resources from being unnecessarily and/or inefficiently used, and to increase the speed and efficiency of a countermeasure for an attack through the network 170.

FIG. 2 illustrates an example of a list of events detected in an intrusion detection system (IDS) management console according to at least one example embodiment. As a security device, an IDS may detect traffic that matches a desired and/or preregistered pattern with respect to a character string determined as a security attack in network traffic, for example, received packets. An event list of FIG. 2 may refer to a list of events detected by the IDS. Referring to FIG. 2, the event list may include information, for example, an attack type, a signature group, severity, a time detected, a source IP address, an attacker port, a destination IP address, and/or a destination port, etc., but the example embodiments are not limited thereto.

FIG. 3 illustrates an example of detailed information on an event detected in an IDS management console according to at least one example embodiment, and FIG. 4 illustrates an example of actual network packet information on an event detected in an IDS management console according to at least one example embodiment. FIG. 3 indirectly shows that a single event may be identified using an event name, a source IP address, a source port, a destination IP address, a destination port, and a time detected, but the example embodiments are not limited thereto. FIG. 4 shows that actual network packet information is managed with respect to a single event.

An event detected by a security device, such as an IDS, may be transmitted to the SIEM server 120. The SIEM server 120 may verify a condition based on a correlation rule for the received event, may determine whether to generate an alert, and may generate the alert for an event required to be additionally analyzed.

FIG. 5 illustrates an example of an alert occurring in a SIEM server according to at least one example embodiment. FIG. 5 illustrates an example of data related to information on an event for which an alert is generated. The information may be transmitted from the SIEM server 120 to the security control management server 130 and may be registered to the security control management server 130.

FIG. 6 illustrates an example of a waiting list of a registered event according to at least one example embodiment. FIG. 6 illustrates an example of a screen 600 that is a portion of a user interface screen that is provided from the security control management server 130 to control personnel, and a list of events that are registered to the security control management server 130 and waiting for validity verification. Here, the control personnel may select the events displayed on the screen 600, may verify detailed information of each of the selected events, and may verify the validity of the selected events. For example, a 'correct detection' button 610 may indicate that the selected event is a valid detection and an 'incorrect detection' button 620 may indicate that the selected event is an invalid detection.

As described above, the control personnel need to manually verify the validity each time with respect to events registered to the security control management server 130. According to example embodiments, it is possible to reduce a number of events of which validity is to be manually verified by the control personnel by registering exceptional processing of an uninfluential event to the SIEM server 120 through the event analysis server 140 and the log verification server 150, such that the SIEM server 120 may filter out the uninfluential event and may not register the filtered event to the security control management server 130.

FIG. 7 illustrates an example of verifying influence of a detected event according to at least one example embodiment.

A first box 710 indicated with broken lines represents an example of raw data that is collected by the log verification server 150 from the database 160 of the security device in which the received event is generated through the process ⑤ of FIG. 1.

Also, a second box 720 indicated with broken lines represents an example of a uniform resource locator (URL) that is extracted by the log verification server 150 by parsing the raw data through the process ⑥ of FIG. 1.

Also, a third box 730 indicated with broken lines represents an example of a response result, for example, a source code of a page (e.g., webpage) corresponding to a URL, that is received by the log verification server 150 from a corresponding server through access using the extracted URL through the process ⑦ of FIG. 1.

As described above, the log verification server 150 may transmit the received response result to the event analysis server 140. The event analysis server 140 may verify a 404 response code from the response result and may verify that the corresponding event is uninfluential.

Also, a fourth box 740 indicated with broken lines represents an identifier (USD_316_Eval_One_Line_PHP_WebShell_090803) for a corresponding attack, a destination IP address (125.6.190.6), and a destination port number (80). The SIEM server 120 may reduce and/or prevent an event from occurring with respect to a corresponding attack or object by exceptionally processing the attack, the destination IP address, and the destination port number.

FIG. 7 illustrates an example of exceptionally processing an uninfluential event. However, depending on example embodiments, with respect to a highly influential event, the corresponding event may be registered and the SIEM server 120 may transmit a separate alert message to the security control management server 130, so that the control personnel may not miss the highly influential event.

Figure 8:
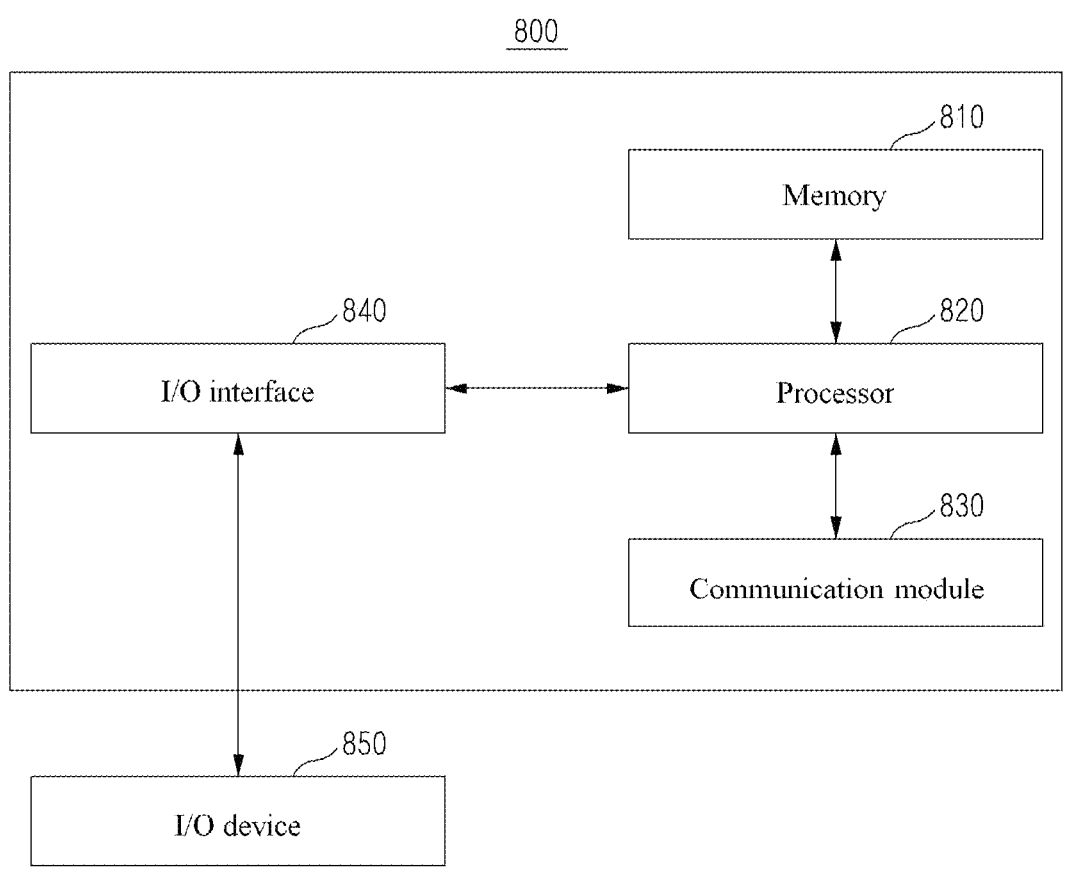
FIG. 8 is a diagram illustrating an example of a configuration of a validity verification server according to at least one example embodiment.

FIG. 8 is a diagram illustrating an example of a validity verification server according to at least one example embodiment. The example embodiment is described based on an example in which the security control management server 130, the event analysis server 140, and the log verification server 150 are implemented as a single validity verification server 800, but the example embodiments are not limited thereto. Referring to FIG. 8, the validity verification server 800 may include a memory 810, at least one processor 820, a communication module 830, and/or an I/O interface 840, etc., but is not limited thereto. The memory 810 may include a permanent mass storage device, such as random access memory (RAM), read only memory (ROM), a disk drive, a solid state drive (SSD), a flash memory, etc., as a non-transitory computer-readable storage medium. Here, the permanent mass storage device, such as ROM, may be included as a permanent storage device separate from the memory 810. Also, an OS and at least one program code may be stored in the memory 810. Such software components may be loaded from another non-transitory computer-readable storage medium separate from the memory 810. The other non-transitory computer-readable storage medium may include, for example, a floppy drive, a disk, a tape, a Blu-ray/DVD/CD-ROM drive, a memory card, etc. According to other example embodiment, software components may be loaded to the memory 810 through the communication module 830, instead of, or in addition, to the non-transitory computer-readable storage medium.

The processor 820 may be configured to process computer-readable instructions of a computer program by performing basic arithmetic operations, logic operations, and I/O operations. The computer-readable instructions may be provided from the memory 810 and/or the communication module 830 to the processor 820. For example, the processor 820 may be configured to execute received instructions in response to the program code loaded to the memory 810.

The communication module 830 may provide a function for communication with other physical devices over a network. For example, the communication module 830 may provide a function of transmitting and receiving data to and from the SIEM server 120 or security devices over the network.

The I/O interface 840 may be a device for interface with the I/O device 850. For example, in the I/O device 850, an input device may include a device, for example, a keyboard and a mouse, etc., and an output device may include a device, for example, a display and a speaker, etc. Although FIG. 8 illustrates that the I/O device 850 is separate from the validity verification server 800, the validity verification server 800 may be configured such that the I/O device 850 may be included in the validity verification server 800.

According to other example embodiments, the validity verification server 800 may include a greater or lesser number of components that a number of components shown in FIG. 8. For example, the validity verification server 800 may further include various types of components, such as various types of physical buttons, a touch panel, and an optical output device.

Figure 9:
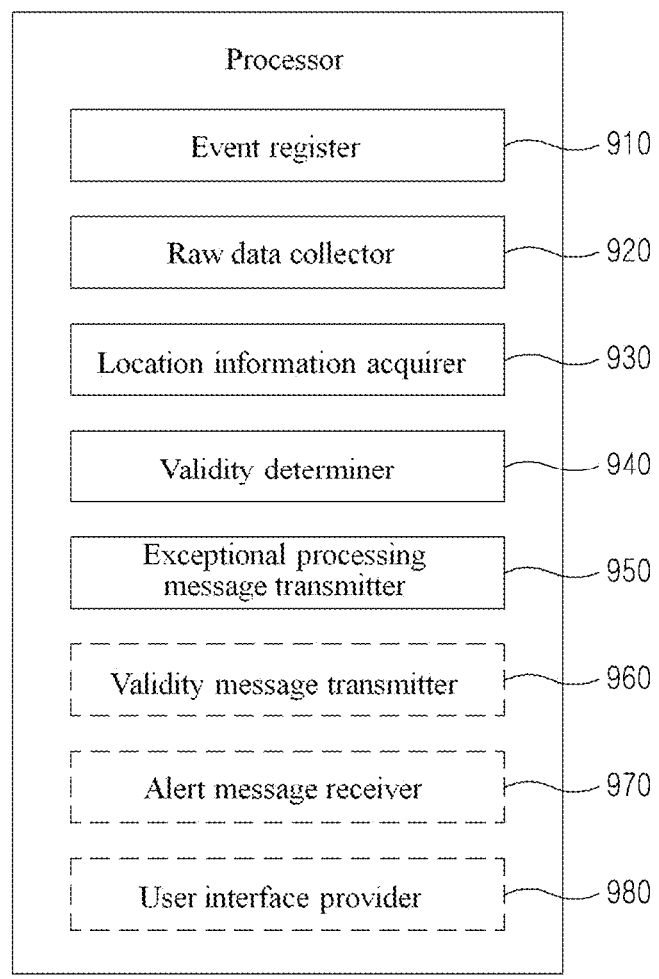
FIG. 9 is a diagram illustrating an example of components includable in at least one processor of a validity verification server according to at least one example embodiment.
Figure 10:
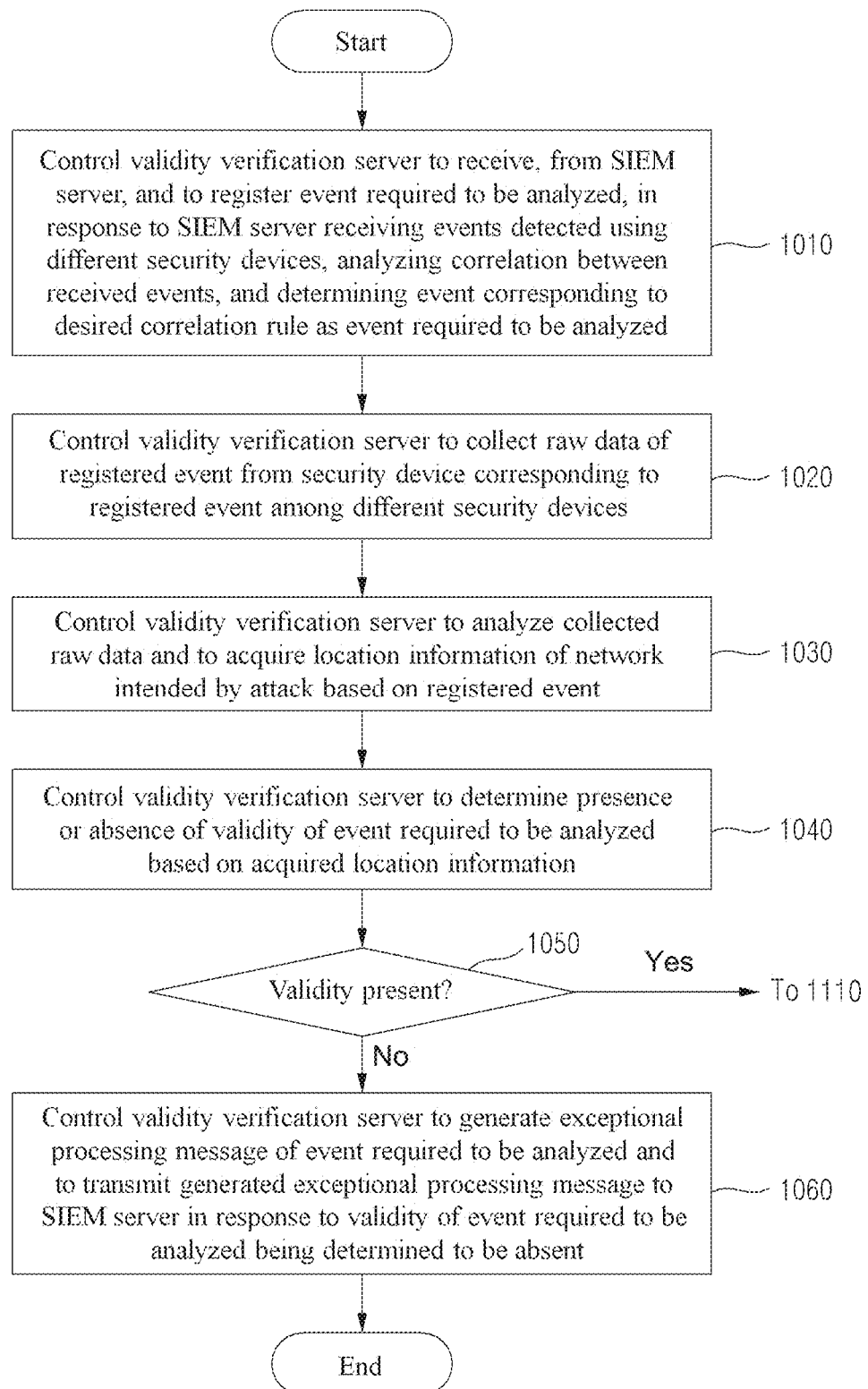
FIG. 10 is a flowchart illustrating an example of a validity verification method performed by a validity verification server according to at least one example embodiment.
Figure 11:
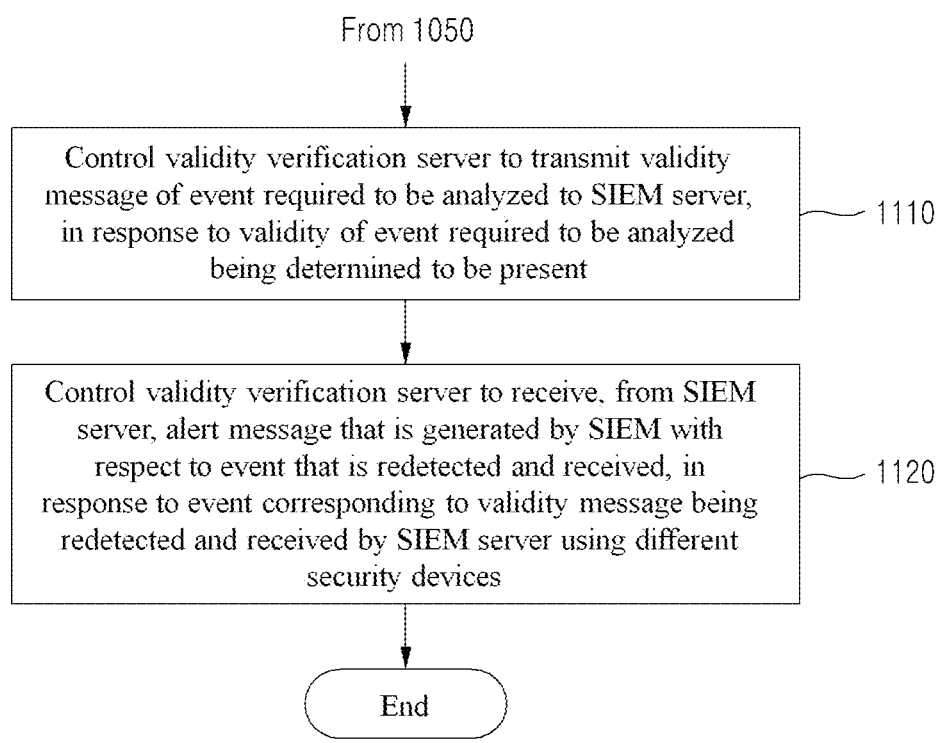
FIGS. 11 and 12 are flowcharts illustrating examples of operations further includable in the validity verification method of FIG. 10 according to at least one example embodiment.
Figure 12:
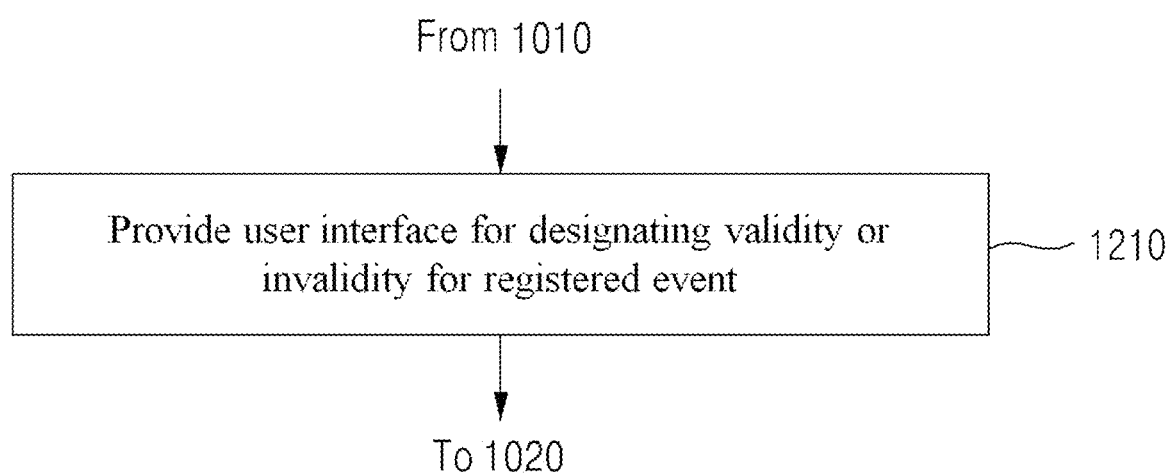

FIG. 9 is a diagram illustrating an example of components includable in a processor of a validity verification server according to at least one example embodiment, and FIG. 10 is a flowchart illustrating an example of a validity verification method performed by a validity verification server according to at least one example embodiment. FIGS. 11 and 12 are flowcharts illustrating examples of operations further includable in the validity verification method of FIG. 10 according to at least one example embodiment.

FIG. 9 illustrates an event register 910, a raw data collector 920, a location information acquirer 930, a validity determiner 940, and/or an exceptional processing message transmitter 950, etc., as components includable in the at least one processor 820 of the validity verification server 800. Referring to FIG. 9, the processor 820 may further include at least one of a validity message transmitter 960, an alert message receiver 970, and/or a user interface provider 980, etc., depending on example embodiments. The processor 820 and the components of the processor 820 may be configured to perform operations 1010 to 1060 included in the validity verification method of FIG. 10 and operations 1110, 1120, and 1210 of FIGS. 11 and 12. Here, the processor 820 and the components of the processor 820 may be configured to execute an instruction according to a code of at least one computer program and/or a code of the OS included in the memory 810. Here, the components of the processor 820 may be representations of different functions of the processor 820 performed by the processor 820 in response to a control instruction provided from a code of the computer program stored in the validity verification server 800. For example, the processor 820 may read a necessary control instruction from the memory 810 to which instructions associated with control of the validity verification server 800 are loaded, and may control the validity verification server 800 to perform operations 1010 to 1060 of FIG. 10 and operations 1110, 1120, and 1210 of FIGS. 11 and 12 in response to the read control instruction.

Referring to FIG. 10, in operation 1010, the event register 910 may control the validity verification server 800 to receive, from a SIEM server, and to register an event required to be analyzed, in response to the SIEM server receiving events detected using different security devices, analyzing a correlation between the received events, and determining an event corresponding to a desired correlation rule as the event required to be analyzed. Here, the SIEM server may correspond to the SIEM server 120 of FIG. 1. That is, the SIEM server may receive events detected at different security devices indicated by the box 110 of FIG. 1, may analyze a correlation between the received events, and may transmit an event that meets a desired and/or preset correlation rule among the events to the validity verification server 800 to be registered. Here, the event register 910 may control the validity verification server 800 to register the event received from the SIEM server.

Operation 1210 of FIG. 12 may be performed after operation 1010.

Referring to FIG. 12, in operation 1210, the user interface provider 980 may provide a user interface capable of designating a validity or an invalidity of the registered event. For example, as described above with reference to FIG. 6, the user interface for designating a waiting list of events registered through the validity verification server 800 and designating a validity or an invalidity of an event in the waiting list may be provided to control personnel. The user interface may be displayed on a display directly connected to the validity verification server 800 or may be displayed for the control personnel through displays of terminals of the control personnel that communicate with the validity verification server 800.

In operation 1020, the raw data collector 920 may control the validity verification server 800 to collect raw data of the registered event from a security device corresponding to the registered event among the different security devices. For example, if the registered event is an event generated at the IDS/IPS security device included in the box 110 of FIG. 1, the validity verification server 800 may connect to the IDS/IPS security device under control of the raw data collector 920 and may collect the raw data of the registered event from a database included in the IDS/IPS security device. Examples of the raw data are described above with reference to FIG. 7.

In operation 1030, the location information acquirer 930 may control the validity verification server 800 to analyze the collected raw data and to acquire location information of a network intended by an attack based on the registered event. The location information of the network may be a URI including a URL, but is not limited thereto. Although the example embodiments are described based on a specific webpage of the network, the attack for the network is not limited to the webpage. That is, in the example embodiment, the location information of the network may indicate location information on a resource on the network intended by a packet of an attacker, such as an IP address of a network device, etc.

In operation 1040, the validity determiner 940 may control the validity verification server 800 to determine presence or absence of validity of the event required to be analyzed (and/or determine the validity status of the event to be analyzed, etc.) based on the acquired location information. For example, the validity determiner 940 may carry out the same attack as the attack based on the acquired location information, may verify and analyze a response result from a system corresponding to the acquired location information, and may determine the presence or absence of validity of the event required to be analyzed. In detail, the acquired location information may include a URI for the page of the network. In this case, the validity determiner 940 may receive a response code for a state of the page through connection the page using the URI, may analyze the received response code, and may determine the presence or absence of validity of the event required to be analyzed. Since an attack against a page that cannot be found, such as HTTP 404 code, a corresponding event has no validity.

When the validity of the event is determined to be present in operation 1050, operation 1060 may be performed. Otherwise, that is, when the validity of the event is determined to be absent, operation 1110 of FIG. 11 may be performed.

When the validity of the event required to be analyzed is determined to be absent, the exceptional processing message transmitter 950 may control the validity verification server 800 to generate an exceptional processing message of the event required to be analyzed and to transmit the generated exceptional processing message to the SIEM server in operation 1060. In this case, in response to the event corresponding to the exception processing message being redetected and received using the different security devices, the SIEM server may update the desired correlation rule to exceptionally process the redetected and received event. That is, the event corresponding to the exception processing message may be filtered out at the SIEM server and may not be registered to the validity verification server 800. Accordingly, a number of events of which validity is to be verified by the control personnel may decrease.

When the validity of the event required to be analyzed is determined to be present, the validity message transmitter 960 may control the validity verification server 800 to transmit a validity message of the event required to be analyzed to the SIEM server in operation 1110. For example, if a risk for the specific event is determined to be high, the validity verification server 800 may transmit the validity message for the corresponding event to the SIEM server.

When the event corresponding to the validity message is redetected and received at the SIEM server using the different security devices, the alert message receiver 970 may control the validity verification server 800 to receive, from the SIEM server, an alert message that is generated by the SIEM server with respect to the redetected and the event in operation 1120. That is, when the event corresponding to the validity message is redetected and received by the SIEM server using the different security devices, the corresponding event may be registered to the validity verification server 800 in operation 1010 and a separate alert message may be further transmitted to the validity verification server 800. In this case, the validity verification server 800 may provide additional information or alerts to the control personal regarding an event corresponding to the alert message so that the control personnel may securely analyze the corresponding event.

According to some example embodiments, it is possible to reduce and/or prevent resources from being unnecessarily and/or inefficiently used, and to enhance the speed and/or efficiency of countermeasure for an attack through a network by automating the validity verification for detection results having a relatively low validity verification necessity based on the influence of events detected in association with a security operation.

The systems and or apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A validity verification method comprising:
    receiving, using at least one processor, an event to be analyzed from a security information & event management (SIEM) server, the event to be analyzed corresponding to a potential attack, the event to be analyzed selected by the SIEM server from a plurality of events detected by different security devices based on a desired correlation rule used to filter the plurality of events received by the different security devices;
    registering, using the at least one processor, the event to be analyzed;
    collecting, using the at least one processor, raw data associated with the registered event from a security device corresponding to the registered event among the different security devices in response to the registration of the event;
    acquiring, using the at least one processor, location information of an intended network location associated with a network attack based on the collected raw data;
    simulating, using the at least one processor, a network attack using the acquired location information based on the network attack corresponding to the registered event;
    determining, using the at least one processor, a validity status of the registered event based on the simulated network attack;
    generating, using the at least one processor, an exceptional processing message of the registered event based on results of the determining the validity status of the registered event; and
    transmitting, using the at least one processor, the generated exceptional processing message to the SIEM server.

2. The method of claim 1, wherein in response to the registered event corresponding to the exceptional processing message being redetected and received by the different security devices, the SIEM server is caused to update the correlation rule to automatically process the redetected and received event.

3. The method of claim 1, further comprising:
    transmitting, using the at least one processor, a validity message of the registered event to the SIEM server indicating the registered event is valid based on the results of the determining the validity status; and
    receiving, using the at least one processor, from the SIEM server, an alert message generated by the SIEM server in response to the event corresponding to the validity message being redetected and received by the SIEM server by the different security devices.

4. The method of claim 1, wherein the determining the validity status comprises:
    determining the validity status of the registered event based on a response to the simulated network attack received from a computer system corresponding to the acquired location information.

5. The method of claim 1, wherein
    the acquired location information comprises a uniform resource identifier (URI) for a webpage of a network; and
    the determining comprises,
        receiving a response code for a state of the webpage through a connection to the webpage using the URI,
        analyzing the received response code, and
        determining the validity status of the registered event based on results of the analysis of the received response code.

6. The method of claim 1, further comprising:
    providing, using at least one processor, a user interface for designating a validity status for the registered event.

7. The method of claim 1, wherein the collecting the raw data associated with the registered event further includes:
    collecting the raw data associated with the registered event from a database included in the security device corresponding to the registered event.

8. A validity verification server, comprising:
    at least one processor configured to execute computer-readable instructions to,
    receive an event to be analyzed from a security information & event management (SIEM) server, the event to be analyzed corresponding to a potential attack, the event to be analyzed selected by the SIEM server from a plurality of events detected by different security devices based on a desired correlation rule used to filter the plurality of events received by the different security devices;
    register the event to be analyzed;
    collect raw data associated with the registered event from a security device corresponding to the registered event among the different security devices in response to the registration of the event;
    acquire location information of an intended network location associated with a network attack based on the collected raw data;
    simulating a network attack using the acquired location information based on the network attack corresponding to the registered event;
    determine a validity status of the registered event based on the simulated network attack;
    generate an exceptional processing message of the registered event based on results of the determining the validity status of the registered event; and
    transmit the generated exceptional processing message to the SIEM server.

9. The validity verification server of claim 8, wherein, in response to the event corresponding to the exceptional processing message being redetected and received by different security devices, the SIEM server is caused to update the correlation rule to automatically process the redetected and received event.

10. The validity verification server of claim 8, wherein the at least one processor is further configured to:
   transmit a validity message of the registered event to the SIEM server indicating the registered event is valid based on the results of the determining the validity status; and
   receive, from the SIEM server, an alert message generated by the SIEM in response to the event corresponding to the validity message being redetected and received by the SIEM server by the different security devices.

11. The validity verification server of claim 8, wherein the determining the validity status of the registered event further includes:
   determining the validity status of the registered event based on a response to the simulated network attack received from a computer system corresponding to the acquired location information.

12. The validity verification server of claim 8, wherein the acquired location information comprises a uniform resource identifier (URI) for a webpage of a network; and
   the determining the validity status of the registered event includes,
      receiving a response code for a state of the webpage through a connection to the webpage using the URI,
      analyzing the received response code, and
      determine the validity status of the registered event based on results of the analysis of the received response code.

13. The validity verification server of claim 8, wherein the at least one processor is further configured to provide a user interface for designating a validity status for the registered event.

14. The validity verification server of claim 8, wherein the collecting the raw data associated with the registered event further includes:
   collecting the raw data associated with the registered event from a database included in the security device corresponding to the registered event.

15. A non-transitory computer readable medium storing computer readable instructions which, when executed by at least one processor, cause the at least one processor to perform a method comprising:
   receiving an event to be analyzed from a security information & event management (SIEM) server, the event to be analyzed corresponding to a potential attack, the event to be analyzed selected by the SIEM server from a plurality of events detected by different security devices based on a desired correlation rule used to filter the plurality of events received by the different security devices;
   registering the event to be analyzed;
   collecting raw data associated with the registered event from a security device corresponding to the registered event among the different security devices in response to the registration of the event;
   acquiring location information of an intended network location associated with a network attack based on the collected raw data;
   simulating a network attack using the acquired location information based on the network attack corresponding to the registered event;
   determining a validity status of the registered event based on the simulated network attack;
   generating an exceptional processing message of the registered event based on results of the determining the validity status of the registered event; and
   transmitting the generated exceptional processing message to the SIEM server.

16. The non-transitory computer readable medium of claim 15, wherein the method further comprises:
   in response to the event corresponding to the exceptional processing message being redetected and received by different security devices, updating the correlation rule to automatically process the redetected and received event.

17. The non-transitory computer readable medium of claim 15, wherein the method further comprises:
   transmitting a validity message of the registered event to the SIEM server indicating the registered event is valid based on the results of the determining the validity status; and
   receiving, from the SIEM server, an alert message generated by the SIEM in response to the event corresponding to the validity message being redetected and received by the SIEM server by the different security devices.

18. The non-transitory computer readable medium of claim 15, wherein, the determining the validity status of the registered event further includes:
   determining the validity status of the registered event based on a response to the simulated network attack received from a computer system corresponding to the acquired location information.

19. The non-transitory computer readable medium of claim 15, wherein
   the acquired location information comprises a uniform resource identifier (URI) for a webpage of a network; and
   the determining the validity status of the registered event includes,
      receiving a response code for a state of the webpage through a connection to the webpage using the URI,
      analyzing the received response code, and
      determine the validity status of the registered event based on results of the analysis of the received response code.

20. The non-transitory computer readable medium of claim 15, wherein the method further comprises:
   providing a user interface for designating a validity status for the registered event.

* * * * *